United States Patent
Tanzer et al.

(10) Patent No.: US 7,120,511 B1
(45) Date of Patent: Oct. 10, 2006

(54) METHOD AND SYSTEM FOR SCHEDULING MAINTENANCE PROCEDURES BASED UPON WORKLOAD DISTRIBUTION

(75) Inventors: Troy Anthony Tanzer, Red Rock, TX (US); Elizabeth Weaver, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 168 days.

(21) Appl. No.: 10/915,883

(22) Filed: Aug. 11, 2004

(51) Int. Cl.
*G06F 19/00* (2006.01)
(52) U.S. Cl. .................................................. 700/100
(58) Field of Classification Search ........... 700/95–97, 700/99–102, 117–121
See application file for complete search history.

(56) References Cited

U.S. PATENT DOCUMENTS

| | | | | |
|---|---|---|---|---|
| 5,040,123 A | * | 8/1991 | Barber et al. ............... | 700/100 |
| 5,216,612 A | * | 6/1993 | Cornett et al. .............. | 700/96 |
| 5,940,298 A | * | 8/1999 | Pan et al. .................... | 700/100 |
| 6,303,395 B1 | * | 10/2001 | Nulman ....................... | 438/14 |
| 6,408,220 B1 | * | 6/2002 | Nulman ....................... | 700/121 |
| 6,456,894 B1 | * | 9/2002 | Nulman ....................... | 700/121 |
| 6,757,580 B1 | * | 6/2004 | Shimada et al. ............ | 700/108 |
| 6,785,586 B1 | * | 8/2004 | Toprac et al. ............... | 700/175 |
| 6,879,866 B1 | * | 4/2005 | Tel et al. ..................... | 700/100 |
| 6,952,656 B1 | * | 10/2005 | Cordova et al. ............ | 702/117 |
| 6,983,188 B1 | * | 1/2006 | Loughran et al. ........... | 700/99 |
| 6,999,829 B1 | * | 2/2006 | Bazzocchi et al. .......... | 700/99 |

* cited by examiner

*Primary Examiner*—Maria N. Von Buhr
(74) *Attorney, Agent, or Firm*—Williams, Morgan & Amerson, P.C.

(57) ABSTRACT

The present invention is generally directed to various methods and systems for scheduling maintenance procedures based upon workload distribution. In one illustrative embodiment, the method includes providing a tool, identifying a planned processing schedule for processing a plurality of wafer lots in the tool, and providing a controller that schedules a time for a maintenance procedure to be performed on the tool based upon the planned processing schedule of the plurality of wafer lots.

19 Claims, 4 Drawing Sheets

|     | DAY |   |   |   |   | ← 25 → |   |   |   |   |   |   |   |   |   |   |   |   |   |   |   |   |
| --- | --- | - | - | - | - | - | - | - | - | - | - | - | - | - | - | - | - | - | - | - | - | - |
| LOT | 1 | 2 | 3 | 4 | 5 | 6 | 7 | 8 | 9 | 10 | 11 | 12 | 13 | 14 | 15 | 16 | 17 | 18 | 19 | 20 | 21 |
| 1 |   |   |   |   |   |   | x |   |   |   |   |   |   |   |   |   |   |   |   |   |   |
| 2 |   |   |   |   |   |   | x |   |   |   |   |   |   |   |   |   |   |   |   |   |   |
| 3 |   |   |   |   |   |   |   | x |   |   |   |   |   |   |   |   |   |   |   |   |   |
| 4 |   |   |   |   |   |   |   |   |   | x |   |   |   |   |   |   |   |   |   |   |   |
| 5 |   |   |   |   |   |   |   |   |   |   | x |   |   |   |   |   |   |   |   |   |   |
| 6 |   |   |   |   |   |   |   |   |   |   |   |   |   | x |   |   |   |   |   |   |   |
| 7 |   |   |   |   |   |   |   |   |   |   |   | x |   |   |   |   |   |   |   |   |   |
| 8 |   |   |   |   |   |   |   |   |   |   |   |   |   | x |   |   |   |   |   |   |   |
| 9 |   |   |   |   |   |   |   |   |   |   |   |   |   |   | x |   |   |   |   |   |   |
| n |   |   |   |   |   |   |   |   |   |   |   |   |   |   |   |   |   |   |   |   |   |

Figure 3

METHOD AND SYSTEM FOR SCHEDULING MAINTENANCE PROCEDURES BASED UPON WORKLOAD DISTRIBUTION

BACKGROUND OF THE INVENTION

1. Field of the Invention

This invention relates generally to an industrial process, and, more particularly, to various methods and systems for scheduling maintenance procedures based upon workload distribution.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a lot of wafers using a variety of process tools, including photolithography steppers, etch tools, deposition tools, polishing tools, thermal anneal process tools, ion implantation tools, etc. The technologies underlying semiconductor process tools have attracted increased attention over the last several years, resulting in substantial refinements. However, despite the advances made in this area, many of the process tools that are currently commercially available suffer certain deficiencies. In particular, some of such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender non-optimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

One technique for improving the operation of a semiconductor processing line includes using a factory wide control system to automatically control the operation of the various process tools. The manufacturing tools communicate with a manufacturing framework or a network of processing modules. Each manufacturing tool is generally connected to an equipment interface. The equipment interface is connected to a machine interface that facilitates communications between the manufacturing tool and the manufacturing framework. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

The tools and processes employed in manufacturing integrated circuit devices are very complex. Even minor variations in tool performance can dramatically and adversely impact the effectiveness of manufacturing processes and ultimately production yields. Accordingly, it is extremely important that the processing tools employed in semiconductor manufacturing environments be maintained to a very high standard. Sophisticated maintenance procedures are often performed on such process tools in an effort to insure that the tools are maintained in peak operational condition.

In many cases, maintenance procedures for the various processing tools found within a semiconductor manufacturing facility are performed on a regimented, or routine basis. For example, a given process tool may be scheduled for pre-planned maintenance activities on a weekly, bi-weekly or monthly basis. When such maintenance procedures are performed, the particular processing tool may be out of service for an extended duration of time, e.g., 12–24 hours. Such a methodology for scheduling maintenance activities may reduce the overall efficiency of the manufacturing facility and/or increase product cycle times. In today's semiconductor manufacturing environment, reducing product cycle times and improving manufacturing efficiencies are critical to the profitable production of integrated circuit devices.

The present invention is directed to overcoming, or at least reducing the effects of, one or more of the problems set forth above.

SUMMARY OF THE INVENTION

The present invention is generally directed to various methods and systems for scheduling maintenance procedures based upon workload distribution. The present invention may be used with tools adapted to perform a variety of operations, e.g., process operations, metrology operations, etc. In one illustrative embodiment, the method comprises providing a tool, identifying a planned processing schedule for processing a plurality of wafer lots in the tool, and providing a controller that schedules a time for a maintenance procedure to be performed on the tool based upon the planned processing schedule of the plurality of wafer lots.

In another illustrative embodiment, the method comprises providing a tool, identifying a planned processing schedule for processing a plurality of wafer lots in the tool, providing a controller that identifies a time-wise gap in the planned processing schedule for the plurality of wafer lots wherein the lots are not intended to be processed in the tool and schedules a maintenance procedure to be performed in the time-wise gap in the planned processing schedule, and performing the maintenance procedure on the tool during the time-wise gap in the planned processing schedule.

In yet another illustrative embodiment, the method comprises providing a tool, identifying a planned processing schedule for processing a plurality of wafer lots in the tool, providing a controller that changes a previously scheduled time for a maintenance procedure to be performed on the tool based upon the planned processing schedule of the plurality of wafer lots, and performing the maintenance procedure on the tool at the changed time.

BRIEF DESCRIPTION OF THE DRAWINGS

The invention may be understood by reference to the following description taken in conjunction with the accompanying drawings, in which like reference numerals identify like elements, and in which:

FIG. 3 is a graphical example depicting how the present invention may be employed in connection with scheduling maintenance procedures for a plurality of wafer lots.

Figure 1:
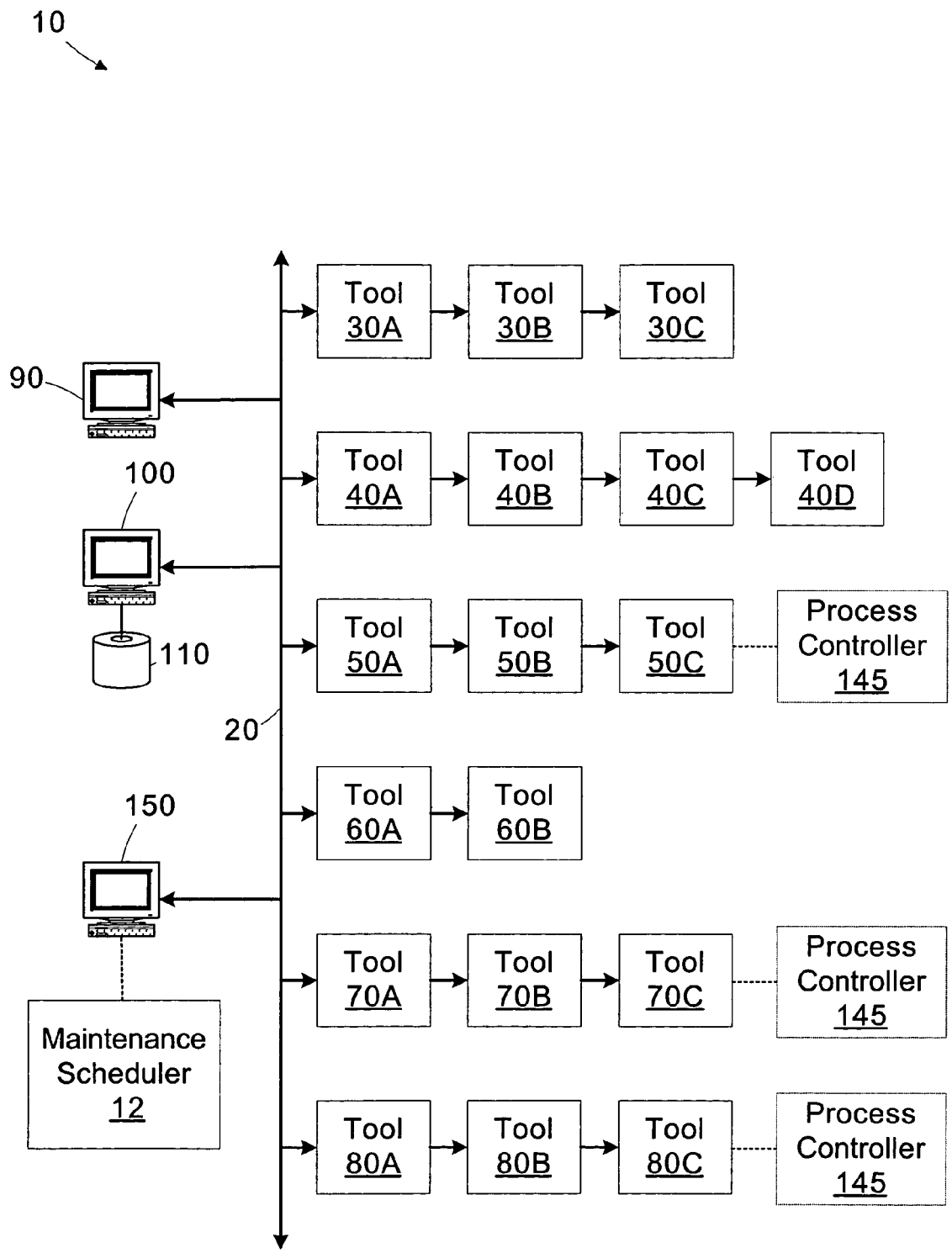
FIG. 1 is a simplified block diagram of a manufacturing system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems, devices and tools may be schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring to FIG. 1, a simplified block diagram of an illustrative manufacturing system 10 is provided. In the illustrated embodiment, the manufacturing system 10 is adapted to fabricate semiconductor devices. Although the invention is described as it may be implemented in a semiconductor fabrication facility, the invention is not so limited and may be applied to other manufacturing environments. The techniques described herein may be applied to a variety of workpieces or manufactured items, including, but not limited to, microprocessors, memory devices, digital signal processors, application specific integrated circuits (ASICs), or other devices. The techniques may also be applied to workpieces or manufactured items other than semiconductor devices.

A network 20 interconnects various components of the manufacturing system 10, allowing them to exchange information. The illustrative manufacturing system 10 includes a plurality of tools 30–80. Each of the tools 30–80 may be coupled to a computer (not shown) for interfacing with the network 20. The tools 30–80 may be grouped into sets of like tools, as denoted by lettered suffixes. For example, the set of tools 30A–30C represent tools of a certain type, such as a chemical mechanical planarization tool. A particular wafer or lot of wafers progresses through the tools 30–80 as it is being manufactured, with each tool 30–80 performing a specific function in the process flow. Exemplary processing tools for a semiconductor device fabrication environment include metrology tools, photolithography steppers, etch tools, deposition tools, polishing tools, rapid thermal anneal tools, implantation tools, etc. The tools 30–80 are illustrated in a rank and file grouping for illustrative purposes only. In an actual implementation, the tools 30–80 may be arranged in any physical order or grouping. Additionally, the connections between the tools in a particular grouping are meant to represent connections to the network 20, rather than interconnections between the tools 30–80.

A manufacturing execution system (MES) server or controller 90 may direct high level operation of the manufacturing system 10. The MES server 90 may monitor the status of the various entities in the manufacturing system 10 (i.e., lots, tools 30–80) and control the flow of articles of manufacture (e.g., lots of semiconductor wafers) through the process flow. A database server 100 is provided for storing data related to the status of the various entities and articles of manufacture in the process flow. The database server 100 may store information in one or more data stores 110. The data may include pre-process and post-process metrology data, tool states, lot priorities, operating recipes, etc. The controller 90 may also provide operating recipes to one or more of the tools depicted in FIG. 1. Of course, the controller 90 need not perform all of these functions. Moreover, the functions described for the controller 90 may be performed by one or more computers spread throughout the system 10.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

The manufacturing system 10 also includes a maintenance scheduler 12 executing on an illustrative workstation 150. As described more fully below, the maintenance scheduler 12 may be employed in scheduling maintenance procedures that are to be performed on any of the tools within the manufacturing system 10. The maintenance scheduler 12 described herein may be used with respect to scheduling maintenance procedures for any type of tool that is used to perform any type of operation. For example, the maintenance scheduler 12 may be used as described herein with any of a variety of different metrology tools and any of a variety of different process tools, e.g., etch tools, deposition tools, CMP tools, etc. Thus, the present invention should not be considered as limited in use to any particular type of tool unless such limitations are expressly set forth in the appended claims.

The maintenance scheduler 12 may communicate with the controller 90 and/or with one or more process controllers 145 associated with the individual tools 30–80 for purposes to be described later herein. The particular control models used by the process controllers 145 depend on the type of tool 30–80 being controlled. The control models may be developed empirically using commonly known linear or non-linear techniques. The control models may be relatively simple equation-based models (e.g., linear, exponential, weighted average, etc.) or a more complex model, such as a neural network model, principal component analysis (PCA) model, partial least squares projection to latent structures (PLS) model. The specific implementation of the control models may vary depending on the modeling techniques selected and the process being controlled. The selection and development of the particular control models would be within the ability of one of ordinary skill in the art, and accordingly, the control models are not described in greater detail herein for clarity and to avoid obscuring the instant invention.

An exemplary information exchange and process control framework suitable for use in the manufacturing system 10 is an Advanced Process Control (APC) framework, such as may be implemented using the Catalyst system formerly offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif.

The processing and data storage functions are distributed amongst the different computers or workstations in FIG. 1 to provide general independence and central information storage. Of course, different numbers of computers and different arrangements may be used without departing from the spirit and scope of the instant invention.

Figure 2:
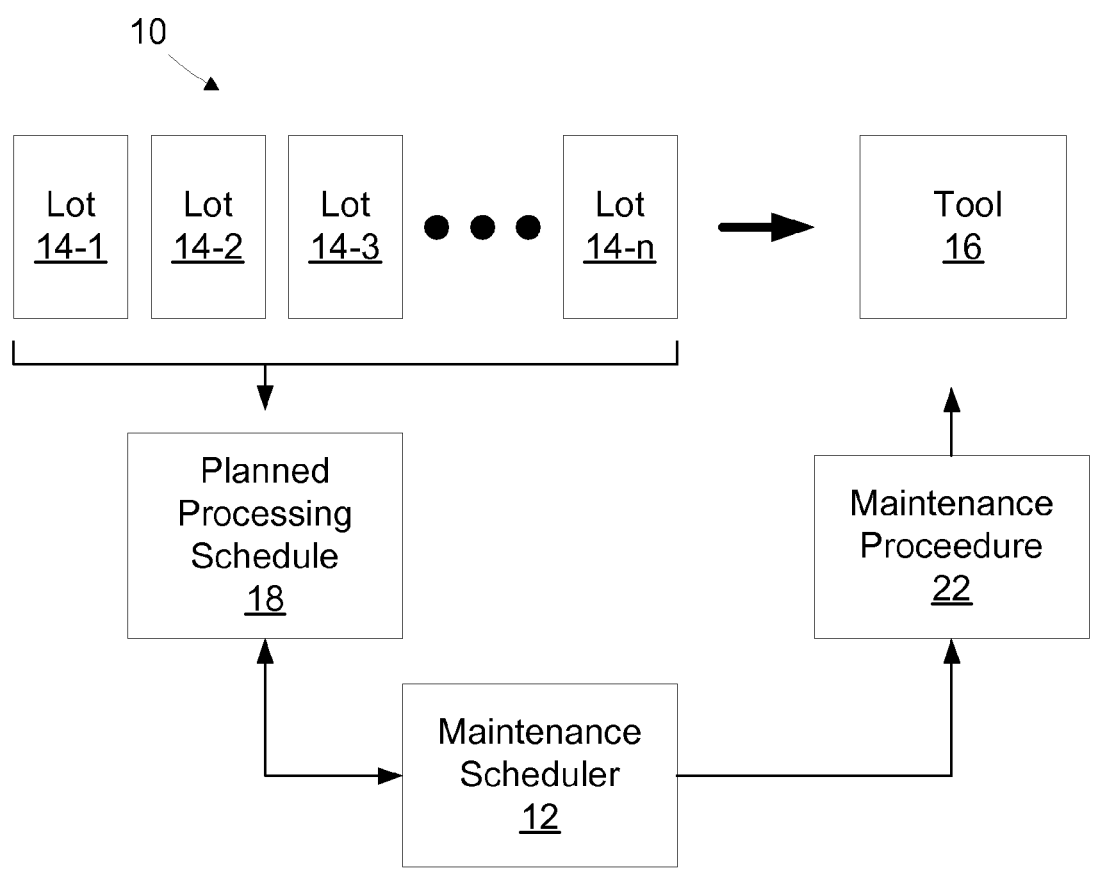
FIG. 2 is a simplified block diagram of a more detailed depiction of a system in accordance with one illustrative embodiment of the present invention.

FIG. 2 is a more specific, simplified block diagram of a portion of a manufacturing system 10 in accordance with one illustrative embodiment of the present invention. As shown therein, the maintenance scheduler 12 may be adapted to schedule a time for performance of a maintenance procedure 22 on the tool 16. As set forth previously, the tool 16 is intended to be representative in nature as it may be representative of any type of tool capable of performing any type of processing operation or metrology operation within a semiconductor manufacturing facility. Also indicated in FIG. 2 are a plurality of wafer lots 14, i.e., lots 14-1, 14-2, 14-3 and 14-n, that are to be processed in the illustrative tool 16. Of course, any number of wafer lots may be processed in the tool 16, and the processing of such wafer lots 14 may occur at regular or irregular time intervals.

As indicated previously, the tool 16 may be a tool adapted to perform any of a variety of different process operations, e.g., a deposition tool, a thermal growth tool, an etching tool, a furnace, a rapid thermal anneal chamber, a photolithography tool, a chemical mechanical polishing tool, etc. In the illustrative example where the tool 16 is a metrology tool, the tool 16 may be adapted to measure at least one of film thickness, film optical properties, surface profile, critical dimensions, etc. Thus, the present invention should not be considered as limited to any particular type of tool nor to the type of operation such tool performs. Similarly, the maintenance procedure 22 described and discussed herein is intended to be representative of any type of maintenance procedure that may be performed on the tool 16. Moreover, the maintenance procedure 22 need not be identical each time it is performed. Thus, to state that a maintenance procedure 22 may be performed on the tool 16 means that one or more maintenance procedures, involving the same or different procedures, may be performed one or more times on the tool 16. Thus, the present invention should not be considered as limited to the type or number of maintenance procedures performed on the tool 16.

In general, the maintenance scheduler 12 is adapted to determine or control when a maintenance procedure 22 is performed on the tool 16. In performing the various functions described herein, the maintenance scheduler 12 may communicate with one or more of the controllers or computers depicted in FIG. 1. According to one aspect of the present invention, the maintenance scheduler 12 is provided with a planned processing schedule 18 for the plurality of wafer lots 14 to be processed in the tool 16. Based upon this planned processing schedule 18, the maintenance scheduler 12 may schedule a time for the performance of the maintenance procedure 22 on the tool 16. The planned processing schedule 18 for the wafer lots 14 may be developed by, or determined from, other computers or controllers within the manufacturing system 10 that monitor the flow of wafer lots throughout the manufacturing system 10. The planned processing schedule 18 for the plurality of wafers lots 14 may be stored at some location within the manufacturing system 10, and the maintenance scheduler 12 may access the information on an as-needed basis, or the planned processing schedule 18 may be routinely provided to the maintenance scheduler 12.

Various operational aspects of the present invention will now be described with reference to FIG. 3. FIG. 3 is a simplistic chart depicting a planned processing schedule 18 for a plurality of wafer lots 1-*n* during an illustrative 21-day processing period. As will be understood by those skilled in the art after a complete reading of the present application, the planned processing schedule 18 for the wafer lots 14 that are to be processed in the tool 16 may vary due to a variety of unrelated factors. For example, the operations to be performed in the tool 16 may be dependent upon the successful completion of various upstream processes prior to the wafer lots 14 being provided to the tool 16. Accordingly, the planned processing schedule 18 for the wafer lots 14 may vary depending upon a wide variety of factors.

As indicated in the background section of the application, in some cases, maintenance procedures for the tool 16 are scheduled for performance on a periodic basis, e.g., weekly, etc. As indicated in FIG. 3, under such a system, maintenance procedures 22 would be performed on the tool 16 on days 7, 14 and 21, as indicated by the bold typeface. The planned processing schedule 18 for the various wafer lots 1-*n* is indicated by an "X" under each of the appropriate days. Of course, in real-world semiconductor manufacturing operations, many wafer lots may be processed through the illustrative tool 16 in a given day. Thus, it should be understood that the information provided in FIG. 3 is by way of example only so as to explain concepts of the present invention in a simplified manner. Based upon the planned processing schedule 18, as indicated by the Xs in FIG. 3, if maintenance procedures were performed on the tool 16 in accordance with the periodic methodology described above, i.e., days 7, 14 and 21, the processing of the lots 1, 2, 6 and 8 would have to be delayed or performed on other processing tools (not shown). That is, performing the maintenance procedure 22 on day 7 would disrupt the planned processing of lots 1 and 2, and performing the maintenance procedure 22 on day 14 would disrupt the planned processing of lots 6 and 8. Moreover, depending upon the particular tool 16 and the type of maintenance procedure to be performed, the tool 16 may be down for one or more days, thereby perhaps impacting the planned processing of other wafer lots. For example, if the maintenance procedure performed on the tool 16 involves two days of downtime, then performing the maintenance procedure on the tool 16 on day 7 would adversely impact the processing schedule for the lot 3.

In view of the foregoing, in accordance with one aspect of the present invention, the maintenance scheduler 12 schedules a time for a maintenance procedure to be performed on the processing tool 16 based upon the planned processing schedule 18 of the plurality of wafer lots 14. In accordance with another aspect of the present invention, the maintenance scheduler's 12 ability to schedule the performance of the maintenance procedure 22 on the tool 16 may also be subject to certain constraints or rules. As a specific example, in the case where a periodic, e.g., weekly, bi-weekly, maintenance protocol is established within the manufacturing facility 10 for a particular tool 16, the maintenance scheduler 12, performing the actions described herein, may be able to change a previously scheduled time for the performance of the maintenance procedure within an allowable range of days that vary from the previously scheduled date established by the periodic plan. For example, as indicated in FIG. 3, a rule may be established such that the maintenance scheduler 12 can schedule the maintenance procedure 22 for a time period that is within plus or minus one day (as indicated by the range 25) or plus or minus two days of a previously scheduled time for performing the maintenance procedure 22.

Another rule that may be employed to constrain the actions of the maintenance scheduler 12 may involve the setting of a minimum number of production days that the tool 16 must be in service between maintenance procedures. For example, the maintenance scheduler 12 may be programmed to insure that the tool 16 is in service for a minimum number of days, e.g., 5 days, between the performance of successive maintenance procedures 22 on the tool 16. Such a limitation insures that the methodologies described herein do not result in the performance of an excessive number of maintenance procedures on the tool 16, and thereby limit the productivity of the tool 16. Of course, instead of number of days in service, the limitation on the frequency of the performance of maintenance procedures may be based upon the processing of a given number of wafer lots through the tool 16. Yet another constraint on the actions of the maintenance schedule 12 may involve establishing a maximum number of days the tool 16 can be in production service without having the maintenance procedure 22 performed on the tool 16. For example, such a rule may provide that, irrespective of any other factor, the maintenance procedure 22 must be performed on the tool 16 if the tool 16 has been in production service for more than a specified number of days, e.g., 9 days.

Other aspects of the present invention will now be described in connection with some very specific illustrative examples. As shown in FIG. 3, if the maintenance procedure 22 was performed on the tool 16 on day 7, in accordance with the planned periodic performance of such maintenance procedures, then the processing of lots 1 and 2 could not be performed as scheduled, and the processing of those lots would have to be delayed or shifted to other tools (not shown) capable of performing the desired process operation. In accordance with the present invention, the maintenance scheduler 12, based upon the planned processing schedule 18 of the wafer lots 14, may schedule the maintenance procedure 22 to be performed earlier, i.e., on day 6, thereby avoiding disruption of the planned processing schedule for the lots 1 and 2. In this illustrative example, it is assumed that the maintenance procedure 22 to be performed on the tool 16 can be performed and the tool 16 can be returned to production service within a single day. As another example, if the maintenance procedure 22 is performed on day 14, in accordance with the typical periodic maintenance scheduling routine, then the processing of lots 6 and 8 would be delayed or otherwise be required to be shifted to other tools. In accordance with the present invention, the maintenance scheduler 12, based upon the planned processing schedule for the wafer lots 14, may schedule the performance of the maintenance procedure 22 to day 15, i.e., a delay of one day, thereby avoiding disruption of the processing of lots 6 and 8. As indicated in FIG. 3, on day 21, there appears to be no processing activity to be performed in the tool 16. Thus, the maintenance scheduler 12 may allow the maintenance procedure 22 to be performed on tool 16 on day 21 in accordance with the periodic planned maintenance schedule for the tool 16.

After a complete reading of the present application, those skilled in the art will appreciate that the methods described herein may provide for a more efficient manufacturing facility and improve production capability. That is, in accordance with at least one aspect of the present invention, the scheduling of maintenance procedures is not based upon a fixed, periodic schedule. Rather, in accordance with the present invention, the maintenance scheduler 12 is adapted to adjust scheduling of maintenance procedures on the tool 16 based upon the planned processing schedule 18 for the processing of the plurality of wafer lots 14 in the tool 16. Moreover, although the present invention has been discussed in the context where a periodic planned maintenance procedure is established for the tool 16, e.g., days 7, 14 and 21 as discussed with respect to FIG. 3, the present invention may be employed in situations where there is no such periodic planned maintenance routine for the tool 16. That is, the present invention may be employed to independently schedule the performance of maintenance procedures 22 on the tool 16 even if there is no pre-planned periodic maintenance schedule for the tool 16. Thus, as used herein, when it is stated that the maintenance scheduler 12 can schedule a maintenance procedure for the tool 16, it is to be understood that the scheduling of such a time for a maintenance procedure may be done relative to a preestablished maintenance schedule, or it may involve the independent establishment of a maintenance schedule. Even more specifically, the maintenance scheduler 12 described herein may change a previously scheduled time for the maintenance procedure 22, i.e., the time for the procedure may be advanced or delayed by one or more days relative to a preestablished plan.

Figure 4:
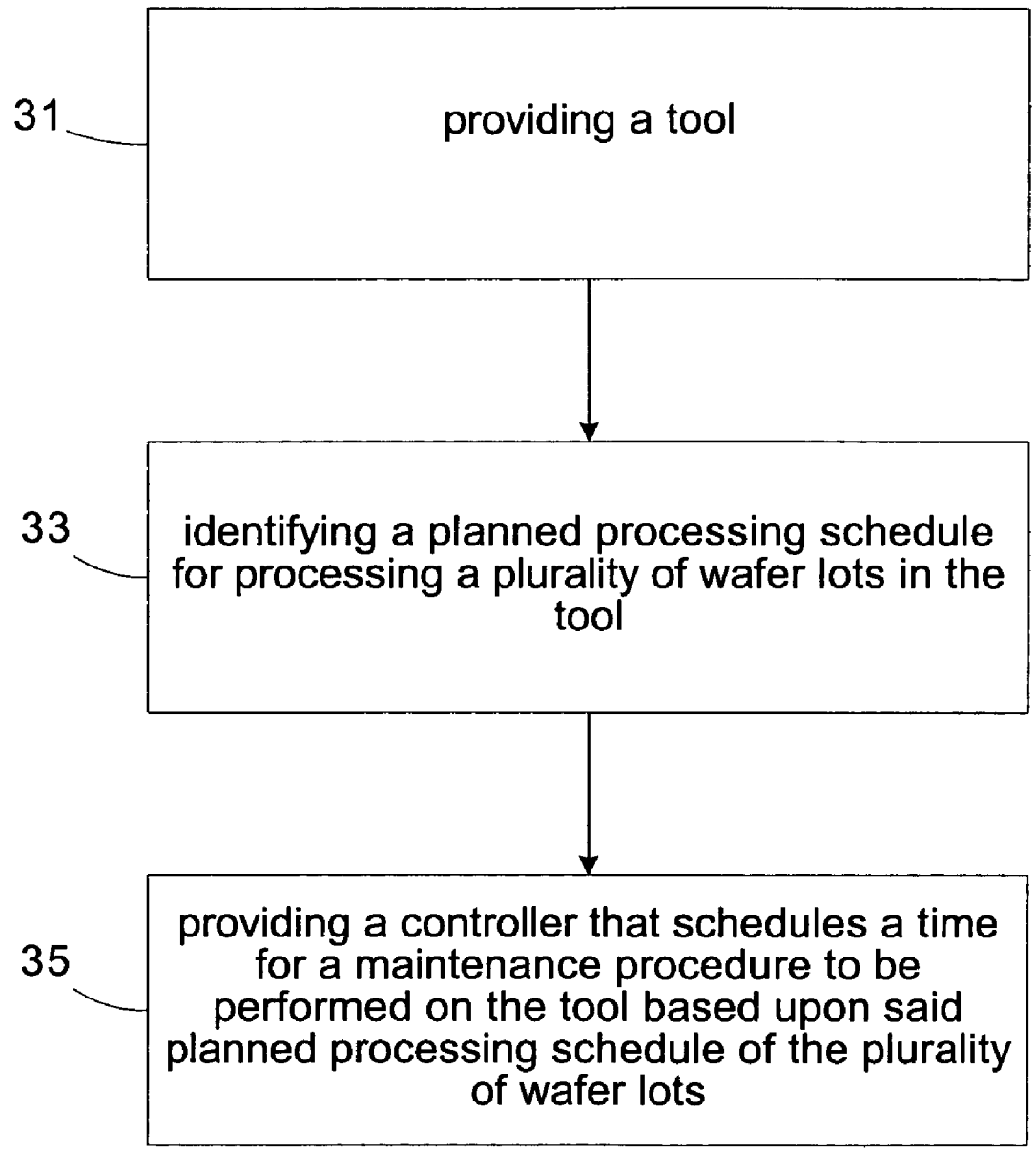
FIG. 4 is a simplified flow diagram of a method in accordance with one illustrative embodiment of the present invention.

The present invention is generally directed to various methods and systems for scheduling maintenance procedures based upon workload distribution. In one illustrative embodiment, as depicted in flowchart form in FIG. 4, the method comprises providing a tool, as set forth in block 31, identifying a planned processing schedule for processing a plurality of wafer lots in the tool, as recited in block 33, and providing a controller that schedules a time for a maintenance procedure to be performed on the tool based upon the planned processing schedule of the plurality of wafer lots, as indicated in block 35. In further embodiments, the method may also include performing the maintenance procedure on the tool at the time scheduled by the controller, i.e., the maintenance scheduler 12. The methods disclosed herein may also include processing additional lots of wafers through the tool 16 after the maintenance procedure has been performed on the tool at the time determined by the controller. In some cases, the controller may change a previously scheduled time for the performance of the maintenance procedure, i.e., advance or delay the performance of the previously planned maintenance procedure based upon the planned production schedule of the wafer lots to be processed in the tool 16. Also, as described previously, in further embodiments, various constraints may be placed on the actions the controller may take.

In another illustrative embodiment, the method comprises providing a tool, identifying a planned processing schedule for processing a plurality of wafer lots in the tool, providing a controller that identifies a time-wise gap in the planned processing schedule for the plurality of wafer lots wherein the lots are not intended to be processed in the tool and schedules a maintenance procedure to be performed in the time-wise gap in the planned processing schedule, and performing the maintenance procedure on the tool during the time-wise gap in the planned processing schedule.

In yet another illustrative embodiment, the method comprises providing a tool, identifying a planned processing schedule for processing a plurality of wafer lots in the tool, providing a controller that changes a previously scheduled time for a maintenance procedure to be performed on the tool based upon the planned processing schedule of the plurality of wafer lots, and performing the maintenance procedure on the tool at the changed time.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
   providing a tool;
   identifying a planned processing schedule for processing a plurality of wafer lots in said tool;
   providing a controller that schedules a time for a maintenance procedure to be performed on said tool based upon said planned processing schedule of said plurality of wafer lots by identifying a number of potential conflicts between the maintenance procedure and the processing of said wafer lots at a plurality of times and selecting one of the times for scheduling the maintenance procedure based on the number of potential conflicts at the associated times.

2. The method of claim 1, further comprising performing said maintenance procedure on said tool at said scheduled time.

3. The method of claim 1, wherein said tool comprises at least one of an etch tool, a deposition tool, an ion implant tool, a photolithography module, a stepper, a furnace, a chemical mechanical planarization tool and a metrology tool.

4. The method of claim 1, wherein said processing of said plurality of wafer lots comprises performing at least one of a metrology process, a deposition process, an etching process, an ion implantation process, a heating process and a chemical mechanical planarization process.

5. The method of claim 1, wherein scheduling said time for said maintenance procedure comprises changing a previously selected time for said maintenance procedure.

6. The method of claim 1, wherein providing a controller that schedules a time for a maintenance procedure to be performed on said tool based upon said planned processing schedule of said plurality of wafer lots comprises:
   identifying a time-wise gap in said planned processing schedule for said plurality of wafer lots wherein said lots are not scheduled to be processed in said tool; and
   scheduling said maintenance procedure to be performed in said time-wise gap in said planned processing schedule.

7. The method of claim 1, wherein providing a controller that schedules a time for a maintenance procedure to be performed on said processing tool based upon said planned processing schedule of said plurality of wafer lots comprises delaying performance of a previously scheduled maintenance procedure based upon said planned processing schedule of said plurality of wafer lots.

8. The method of claim 1, wherein providing a controller that schedules a time for a maintenance procedure to be performed on said processing tool based upon said planned processing schedule of said plurality of wafer lots comprises advancing performance of a previously scheduled maintenance procedure based upon said planned processing schedule of said plurality of wafer lots.

9. The method of claim 1, wherein providing a controller that schedules a time for a maintenance procedure to be performed on said tool based upon said planned processing schedule of said plurality of wafer lots comprises providing a controller that schedules a time for a maintenance procedure to be performed on said tool based upon said planned processing schedule of said plurality of wafer lots subject to a requirement that said maintenance procedure be performed on said tool after said tool has been in production service for a specified period of time.

10. The method of claim 1, wherein providing a controller that schedules a time for a maintenance procedure to be performed on said tool based upon said planned processing schedule of said plurality of wafer lots comprises providing a controller that schedules a time for a maintenance procedure to be performed on said tool based upon said planned processing schedule of said plurality of wafer lots subject to a requirement that said maintenance procedure be performed on said tool after a specified number of wafer lots have been processed through said tool.

11. The method of claim 1, wherein providing a controller that schedules a time for a maintenance procedure to be performed on said tool based upon said planned processing schedule of said plurality of wafer lots comprises providing a controller that schedules a time for a maintenance procedure to be performed on said tool based upon said planned processing schedule of said plurality of wafer lots wherein said scheduled time cannot extend outside of an allowable range relative to a previously scheduled time for performance of said maintenance procedure.

12. The method of claim 1, further comprising processing additional wafer lots in said tool.

13. A method, comprising:
    providing a tool;
    identifying a planned processing schedule for processing a plurality of wafer lots in said tool;
    providing a controller that changes a previously scheduled time for a maintenance procedure to be performed on said tool based upon said planned processing schedule of said plurality of wafer lots, wherein the controller identifies a number of potential conflicts between the maintenance procedure and the processing of said wafer lots at the previously scheduled time and at a plurality of other times and selects one of the other times having fewer potential conflicts than the previously scheduled time; and
    performing said maintenance procedure on said tool at said changed time.

14. The method of claim 13, wherein providing a controller that changes a previously scheduled time for a maintenance procedure to be performed on said processing tool based upon said planned processing schedule of said plurality of wafer lots comprises delaying performance of a previously scheduled maintenance procedure based upon said planned processing schedule of said plurality of wafer lots.

15. The method of claim 13, wherein providing a controller that changes a previously scheduled time for a maintenance procedure to be performed on said processing tool based upon said planned processing schedule of said plurality of wafer lots comprises advancing performance of a previously scheduled maintenance procedure based upon said planned processing schedule of said plurality of wafer lots.

16. The method of claim 13, wherein providing a controller that changes a previously scheduled time for a maintenance procedure to be performed on said tool based upon said planned processing schedule of said plurality of wafer lots comprises providing a controller that changes a previously scheduled time for a maintenance procedure to be performed on said tool based upon said planned processing schedule of said plurality of wafer lots subject to a requirement that said maintenance procedure be performed on said tool after said tool has been in production service for a specified period of time.

17. The method of claim 13, wherein providing a controller that changes a previously scheduled time for a maintenance procedure to be performed on said tool based upon said planned processing schedule of said plurality of wafer lots comprises providing a controller that changes a previously scheduled time for a maintenance procedure to be performed on said tool based upon said planned processing schedule of said plurality of wafer lots subject to a requirement that said maintenance procedure be performed on said tool after a specified number of wafer lots have been processed through said tool.

18. The method of claim 13, wherein providing a controller that changes a previously scheduled time for a maintenance procedure to be performed on said tool based upon said planned processing schedule of said plurality of wafer lots comprises providing a controller that changes a previously scheduled time for a maintenance procedure to be performed on said tool based upon said planned processing schedule of said plurality of wafer lots wherein said changed time cannot extend outside of an allowable range relative to said previously scheduled time for performance of said maintenance procedure.

19. The method of claim 13, further comprising processing additional wafer lots in said tool.

* * * * *